3,015,540
MANUFACTURE OF SUPERPHOSPHORIC ACID
Marcus M. Striplin, Jr., and David McKnight, Florence, and Ellis C. Marks, Sheffield, Ala., assignors to Tennessee Valley Authority, a corporation of the United States
Filed Nov. 23, 1960, Ser. No. 71,372
2 Claims. (Cl. 23—165)
(Granted under Title 35, U.S. Code (1952), sec. 266)

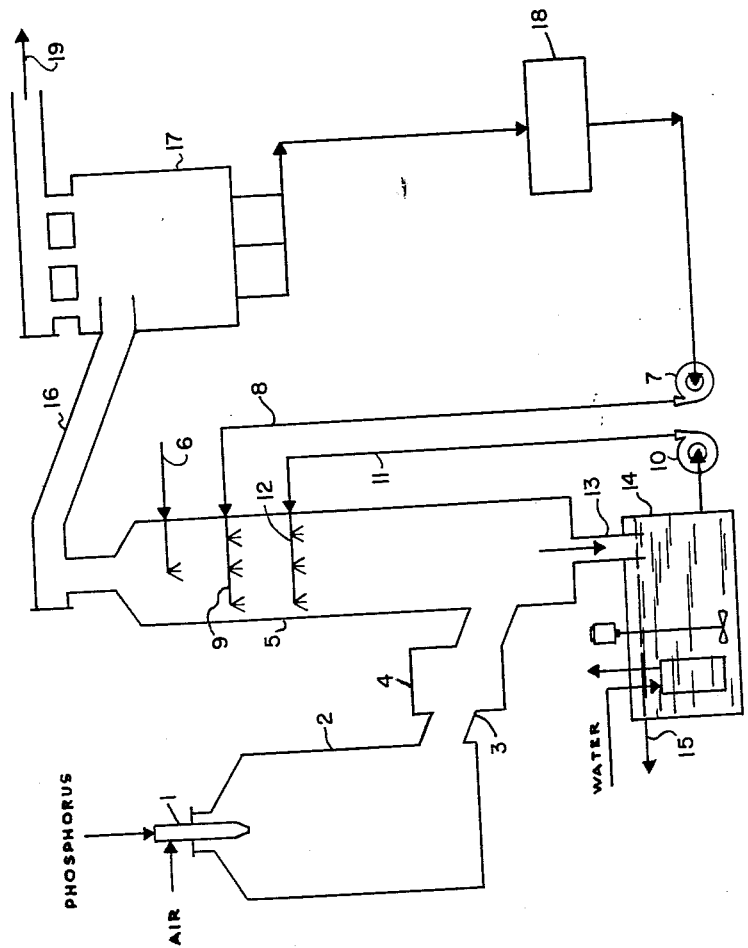

The invention herein described may be manufactured and used by or for the Government for governmental purposes without the payment to us of any royalty therefor.

Our invention relates to an improved process for the production of phosphoric acid, and more particularly to the production of an acid having a concentration between that of orthophosphoric acid (72.4% $P_2O_5$) and pyrophosphoric acid (79.8% $P_2O_5$).

In this range of concentration, the acid is a mixture of orthophosphoric acid with pyro- and other polyphosphoric acids in proportions that vary with the $P_2O_5$ concentration. Moreover, this acid has a number of physical and chemical properties that make it a very desirable material for several purposes of increasing commercial importance. The term "superphosphoric acid" has been used to designate such acids and is used with this meaning in this specification and the appended claims.

Heretofore, four methods of preparing superphosphoric acid have been suggested. These are:

(1) Burning phosphorus with air containing a controlled amount of moisture sufficient to produce phosphoric acid of the desired concentration, followed by cooling and collecting the resulting acid by mechanical means, (2) Burning phosphorus with dried air, cooling and collecting the resulting dry, solid $P_2O_5$ and dissolving it in a quantity of water sufficient to form acid of the desired concentration, (3) Burning phosphorus with undried air, followed by further hydration of the phosphorus pentoxide produced and recovery of the resulting acid mist in a packed tower, such as is shown in U.S. Patent 2,303,318, and (4) Burning phosphorus with dried air and absorbing the resulting phosphorus pentoxide vapor in phosphoric acid of slightly lower concentration than that desired in the product, as is shown in U.S. Patent 2,247,373.

Difficulties and disadvantages have been present in each of these processes. The present invention is an improvement in process (3) above, which is the process commonly employed in the production of phosphoric acid of ordinary concentration (55% to 58% $P_2O_5$).

When such acid of ordinary concentration is produced according to process (3) above, satisfactory control of the temperature in the production equipment may be obtained by introducing into the products of combustion an amount of water considerably in excess of that required for hydration of the phosphorus pentoxide and dilution of the resulting acid to the desired concentration; the excess of water undergoing vaporization and absorbing considerable amounts of latent heat. When superphosphoric acid is the product desired, the amount of water introduced into the process must be limited to prevent dilution of the product acid. The absorption of latent heat is thereby considerably reduced, so that the temperatures in the system are greatly increased unless the rate of phosphorus combustion is reduced to the point that loss of heat through the walls of the equipment is sufficient to prevent excessive temperatures. The reduction in the amount of water supplied to the system has a further undesirable effect in increasing the amount of acid mist or droplets carried out of the hydration zone with the effluent gases. This acid mist must be recovered in a subsequent step with the production also of a considerable quantity of acid somewhat more dilute than the desired product of the process.

It is an object of our invention to provide a process for the production of superphosphoric acid wherein temperatures attained in the hydration step are reduced and corrosion of the hydrator and auxiliary equipment is greatly reduced.

Another object of our invention is to provide such process wherein the quantity of dilute phosphoric acid produced is eliminated.

Still another object of our invention is to provide such process wherein an increased rate of burning phosphorus can be maintained, together with a large increase in the quantity of superphosphoric acid produced.

Our invention, together with further objects and advantages thereof, will be better understood from consideration of the following description.

In carrying out the objects of our invention in one form thereof, we employ a process which comprises burning phosphorus in air; passing the resulting hot phosphorus pentoxide into a hydration zone; spraying water into the hydration zone; spraying relatively cool dilute phosphoric acid from a later-mentioned step into the hydration zone as a free-falling spray of droplets; introducing relatively cool superphosphoric acid from another later-mentioned step into the hydration zone as a flowing film or as a free-falling spray of droplets; collecting sufficient additional phosphoric acid in the falling droplets of phosphoric acid to convert them to superphosphoric acid; withdrawing a hot gaseous effluent from the hydration zone; condensing a more dilute phosphoric acid from the effluent; returning the relatively cool, dilute phosphoric acid into the hydration zone as a spray; withdrawing superphosphoric acid from the lower part of the hydration zone and cooling it appreciably by any convenient means; returning a part of the relatively cool superphosphoric acid into the hydration zone as described above; and withdrawing the remaining cooled superphosphoric acid as the product of the process.

We have found that the return of the cooled, more dilute phosphoric acid to the hydration zone in the form of a free-falling spray is very effective in reducing temperatures and increasing the proportion of superphosphoric acid formed. The cooling effect is due to direct heat exchange between the hot gases and the relatively cool droplets, and to evaporation of water from the droplets. As a result, the quantity of phosphorus burned can be increased 10 to 15 percent or so without raising the temperature in the hydration zone to that normally encountered in producing superphosphoric acid. The gaseous effluent from the hydration zone also is considerably cooler, and corrosion of auxiliary equipment is reduced somewhat.

However, the temperature of the superphosphoric acid collected in the hydration zone is higher than when acid of ordinary concentration is produced, and corrosion is greater than desirable. We have found that this temperature may be reduced and maintained at a satisfactorily low level by removing heat from the superphosphoric acid after it has been withdrawn from the hydration zone and returning a portion of the relatively cool superphosphoric acid to the hydration zone as a film or spray to remove heat from the gases in that zone by direct exchange of sensible heat.

We have found that by utilizing the two means of heat removal mentioned above we can produce superphosphoric acid when burning phosphorus at rates as great as or greater than usually employed in the same plant for the production of the more dilute acid commonly employed (55% to 58% $P_2O_5$), and to accomplish this without the temperatures in the system exceeding those observed when such more dilute acid is produced.

We have also found that superphosphoric acid is less corrosive to most metals than more dilute acid at the same temperature, as shown by the following data from laboratory corrosion tests.

| | Corrosion rate, mils/year | | | |
|---|---|---|---|---|
| | Ordinary phosphoric acid, 56.5% $P_2O_5$ | | Superphosphoric acid, 76.7% $P_2O_5$ | |
| Temperature, °F | 220 | 240 | 220 | 240 |
| Metal tested: | | | | |
| A.I.S.I. Type 316 stainless steel | 5.0 | | 0.5 | 1.6 |
| Ni-o-Nel | | 5.2 | | 0.4 |
| Hastelloy B | | 5.2 | | 0.08 |
| Durimet 20 | | 9.2 | | 0.4 |

Hence, when we are able to produce superphosphoric acid without the temperatures in the system exceeding those observed when acid of ordinary concentration is produced, the corrosive conditions to which portions of the equipment are subjected are actually less severe than when such acid of ordinary concentration is produced.

The attached drawing diagrammatically illustrates an application of principles of our invention in a preferred embodiment in which:

FIGURE 1 is a flow sheet illustrating principles of our novel process which results in a phosphoric acid having the concentrations mentioned above.

Referring now more specifically to FIGURE 1, phosphorus is fed through burner 1, together with an amount of air in excess of that required for combustion, into combustion chamber 2, where it is burned to produce phosphorus pentoxide. The products of combustion pass through duct 3, in which may be inserted a tubular gas cooler 4, into hydration chamber 5 at a temperature in the range of about 700° F. to 1400° F. Water from a source not shown may be fed through line 6 and sprayed into hydration chamber 5. Relatively cool dilute phosphoric acid from a later step in the process also is fed by pump 7 via line 8 into hydration chamber 5, preferably through a spraying device 9 as shown. Alternatively, the cool dilute phosphoric acid may be distributed over a bed of packing or some other means of producing flowing films of acid to facilitate exchange of heat and vaporization of water from the dilute acid to the hot gases in hydration chamber 5. The addition of water through line 6 may be dispensed with, the necessary water for hydration being supplied by the dilute acid.

Relatively cool concentrated acid also is fed into hydration chamber 5 by pump 10 via line 11 through spraying devices 12 as shown, or it may be distributed over a bed of packing material. The phosphorus pentoxide content of the gases entering hydration chamber 5 is converted into a mixture of phosphoric acids by reaction with the water and the water content of the dilute acid introduced as described. Cooling of the gaseous and liquid contents of hydration chamber 5 is effected also by the water and dilute acid, and further cooling is effected by contact with the droplets or films of relatively cool superphosphoric acid introduced as described above.

The mixture of acids constituting superphosphoric acid forms as droplets in the hydration chamber and tends to fall to the bottom where it collects, together with the recycled relatively cool acid and is withdrawn through line 13 to cooler 14. Cooler 14 is shown as a tank provided with water-cooled coils and with an agitator to ensure efficient heat exchange between the acid and the cooling water. However, other forms of coolers may be employed within the scope of this invention. Such forms of coolers include shell-and-tube heat exchangers and evaporative or flash coolers. A flash cooler would be utilized by introducing a suitably diluted acid into a chamber in which concentration and cooling would be effected under reduced pressure. Such a device could offer advantages for cooling superphosphoric acid, since there are no heat-exchange surfaces to be fouled or corroded and effectiveness of cooling is not impaired by the viscosity of the acid.

The superphosphoric acid is withdrawn from hydration chamber 5 at a temperature in the range of about 300° F. to about 400° F. and is cool to a temperature in the range of about 200° F. to about 300° F. A portion of the cooled acid is withdrawn as the product of the process through line 15 to storage. The remainder of the cooled acid is fed by pump 10 via line 11 to hydration chamber 5 as described above.

A gaseous effluent is withdrawn through duct 16 from hydration chamber 5. This effluent comprises nitrogen and excess oxygen from the combustion air, water vapor, and entrained droplets of acid. This effluent, at a temperature in the range of about 250° F. to about 400° F., enters mist-collecting device 17. Device 17 is shown as an electrostatic precipitator in which the droplets of acid are caused to coalesce and undergo some dilution by partial condensation of the water vapor content of the gas. Other means of recovery of the entrained acid droplets may be employed, such as packed-tower or venturi-type scrubbers. In the instance wherein water is not added to hydrator 5, it may be added to the mist-collecting device 17. The relatively dilute acid, at a temperature in the range of about 150° F. to about 250° F., is collected in tank 18 from which it is fed to hydration chamber 5 as described above.

Uncondensed gases, consisting essentially of nitrogen, oxygen, and water vapor, usually at a temperature of about 200° F. or less, are withdrawn by line 19 to a stack or other waste-disposal means.

In order that those skilled in the art may better understand how the present invention can be practiced, the following example is given by way of illustration and not by way of limitation.

*Example*

Our process has been carried out as described above on full commercial scale. The apparatus used was a plant designed for the production of phosphoric acid of ordinary concentration (55% to 58% $P_2O_5$), adapted to the use of our invention for the production of superphosphoric acid by provision for means of cooling the necessary amount of superphosphoric acid and recycling it and the relatively dilute acid from the mist collector to the hydration chamber. The plant was arranged as shown in the attached drawing.

The following table shows, in column 1, the results of a typical day's operation in the production of acid of ordinary concentration. In column 2 are shown the results of a typical day's operation in which superphosphoric acid was produced with the acid recovered from the precipitator being returned to the hydration chamber to effect a partial cooling in accordance with the teaching of our co-pending application Serial No. 648,445, filed March 25, 1957, now U.S. Letters Patent 2,999,010, of which this application is a continuation-in-part.

| | (1) Regular acid | (2) Superphosphoric acid produced by Ser. No. 648,445, filed Mar. 25, 1957 | (3) Superphosphoric acid produced by the present invention |
|---|---|---|---|
| Phosphorus rate, lb./hr. | 2,400 | 2,700 | 3,665 |
| Temperature, °F.: | | | |
| Burner outlet | 1,040 | 1,080 | 1,120 |
| Hydrator inlet | 710 | 810 | 985 |
| Hydrator outlet, gas | 174 | 210 | 201 |
| Hydrator acid | 273 | 410 | 293 |
| Acid from precipitator | 196 | 235 | 118 |
| Acid concentration, Percent $P_2O_5$: | | | |
| From hydrator | 64.0 | 75.3 | 75.1 |
| From precipitator | 58.1 | 63.7 | 67.2 |
| Production rate, lb./hr. of acid as produced in hydrator | 4,250 | 7,200 | 10,000 |

It will be seen that, with an increase in phosphorus-burning rate from 2400 to 2700 pounds per hour, all of the temperatures in the system increased somewhat, and the temperature of the superphosphoric acid from the hydrator increased to 410° F., which was slightly higher than desirable; and further increase in phosphorus-burning rate would result in an excessive temperature at this point. In column 3 the results of a day's operation are shown, in which the methods of the present invention were applied. Dilute acid (67.2% $P_2O_5$) from the precipitator was sprayed into the hydrator at the rate of 1.8 gallons per minute. Superphosphoric acid from the hydrator was cooled to 198° F. in the acid cooler and fed through spray nozzles into the hydrator at a rate of about 180 gallons per minute. While the phosphorus-burning rate in this period of operation was more than 50 percent greater than in the period of operation shown for the production of acid of ordinary concentration, and the temperature of the gas entering the hydrator was appreciably higher than in that period, the temperatures at further points in the system were lower than in the period (col. 2) when superphosphoric acid was produced without return of cooled product acid and very little higher than those in the period (col. 1) when acid or ordinary concentration was produced.

Thus, it was possible to produce superphosphoric acid at production rates substantially increased over those that could be employed without the use of our invention and with temperature conditions in the plant no higher than in normal operation of the plant.

This application is a continuation-in-part of application Serial No. 648,445, filed March 25, 1957, now U.S. Letters Patent 2,999,010 in the names of Marcus M. Striplin, Jr., et al.

While we have shown and described particular embodiments of our invention, modifications and variations thereof will occur to those skilled in the art. We wish it to be understood, therefore, that the appended claims are intended to cover such modifications and variations which are within the true scope and spirit of our invention.

What we claim as new and desire to secure by Letters Patent of the United States is:

1. An improved process for the production of superphosphoric acid which comprises the steps of burning phosphorus in air; passing the resulting hot phosphorus pentoxide at an initial temperature in the range from about 700° F. to about 1400° F. into a vertical hydration zone; introducing water into said hydration zone; introducing dilute phosphoric acid, containing from about 40 percent to about 70 percent $P_2O_5$ from a later-mentioned step, at a temperature in the range from about 150° F. to about 250° F. into said hydration zone; introducing superphosphoric acid, containing from about 72 percent to about 80 percent $P_2O_5$, from another later-mentioned step, at a temperature in the range from about 200° F. to about 300° F., into said hydration zone; adjusting the relative proportions of said acids and said water introduced to maintain in said hydration zone a concentration of about 72 percent to about 80 percent $P_2O_5$ in the resulting collected superphosphoric acid; withdrawing a hot gaseous effluent, at a temperature in the range from about 250° F. to about 400° F., from said hydration zone; condensing dilute phosphoric acid containing from about 40 percent to about 70 percent $P_2O_5$ from said effluent; returning the resulting dilute phosphoric acid at a temperature in the range from about 150° F. to about 250° F. into said hydration zone; withdrawing superphosphoric acid, containing from about 72 percent to about 80 percent $P_2O_5$, from a lower portion of said hydration zone at a temperature in the range from about 300° F. to about 400° F.; cooling said withdrawn superphosphoric acid to a temperature in the range from about 150° F. to about 300° F.; returning a portion of the cooled superphosphoric acid into said hydration zone; and withdrawing the remaining portion of the cooled superphosphoric acid as product.

2. An improved process for the production of superphosphoric acid which comprises the steps of burning phosphoric acid in air; passing the resulting hot phosphorus pentoxide at an initial temperature in the range from about 700° F. to about 1400° F. into a vertical hydration zone; introducing dilute phosphoric acid, containing from about 20 percent to about 40 percent $P_2O_5$ from a later-mentioned step, at a temperature in the range from about 150° F. to about 250° F. into said hydration zone; introducing superphosphoric acid, containing from about 72 percent to about 80 percent $P_2O_5$, from another later-mentioned step, at a temperature in the range from about 200° F. to about 300° F. into said hydration zone; adjusting the relative proportions of said acids introduced to maintain in said hydration zone a concentration of about 72 percent to about 80 percent $P_2O_5$ in the resulting collected superphosphoric acid; withdrawing a hot gaseous effluent at a temperature in the range from about 250° F. to about 400° F. from said hydration zone; adding water to said effluent and condensing therefrom a dilute phosphoric acid containing from about 20 percent to about 40 percent $P_2O_5$; returning the resulting dilute phosphoric acid at a temperature in the range from about 150° F. to about 250° F. into said hydration zone; withdrawing superphosphoric acid, containing from about 72 percent to about 80 percent $P_2O_5$, from a lower portion of said hydration zone at a temperature in the range from about 300° F. to about 400° F.; cooling said withdrawn superphosphoric acid to a temperature in the range from about 150° F. to about 300° F.; returning a portion of the cooled superphosphoric acid into said hydration zone; and withdrawing the remaining portion of the cooled superphosphoric acid as product.

References Cited in the file of this patent

UNITED STATES PATENTS

| | | |
|---|---|---|
| 2,247,373 | Hartford et al. | July 1, 1941 |
| 2,303,318 | Baskervill | Dec. 1, 1942 |
| 2,611,681 | Bellinger | Sept. 23, 1952 |